(12) United States Patent
Matsuo et al.

(10) Patent No.: US 8,064,829 B2
(45) Date of Patent: Nov. 22, 2011

(54) WIRELESS COMMUNICATION SYSTEM, WIRELESS COMMUNICATION DEVICE, PROGRAM, AND WIRELESS COMMUNICATION METHOD

(75) Inventors: Takashi Matsuo, Tokyo (JP); Mitsuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 864 days.

(21) Appl. No.: 12/059,439

(22) Filed: Mar. 31, 2008

(65) Prior Publication Data

US 2008/0261525 A1    Oct. 23, 2008

(30) Foreign Application Priority Data

Apr. 19, 2007   (JP) ................. 2007-111018

(51) Int. Cl.
 *H04B 7/00*   (2006.01)
(52) U.S. Cl. ............... 455/41.2; 455/67.11; 455/426.2
(58) Field of Classification Search ............... 455/41.2, 455/67.11
See application file for complete search history.

(56) References Cited

U.S. PATENT DOCUMENTS

| 7,352,998 B2* | 4/2008 | Palin et al. ................. 455/41.2 |
| 2005/0286478 A1* | 12/2005 | Mela et al. ................. 370/338 |

FOREIGN PATENT DOCUMENTS

| JP | 2001-45452 | 2/2001 |
| JP | 2002-204239 | 7/2002 |
| JP | 2003-274049 | 9/2003 |
| JP | 2004-135258 | 4/2004 |

* cited by examiner

*Primary Examiner* — Yuwen Pan
(74) *Attorney, Agent, or Firm* — Oblon, Spivak, McClelland, Maier & Neustadt, L.L.P.

(57) ABSTRACT

There is provided a wireless communication device that includes a first communication portion that performs non-contact communication with an other wireless communication device and receives unit specific data indicating the other wireless communication device's communication function; a second communication portion that can communicate wirelessly faster than the first communication portion; a determination portion that determines, based on the unit specific data, whether the other wireless communication device's communication function is compatible with the second communication portion; and a format conversion portion that converts a format of transmission data that is transmitted to the other wireless communication device to a format that reduces the volume of the transmission data. If the determination portion determines that the other wireless communication device's communication function is not compatible with the second communication portion, the first communication portion transmits the transmission data to the other wireless communication device in the converted data format.

12 Claims, 8 Drawing Sheets

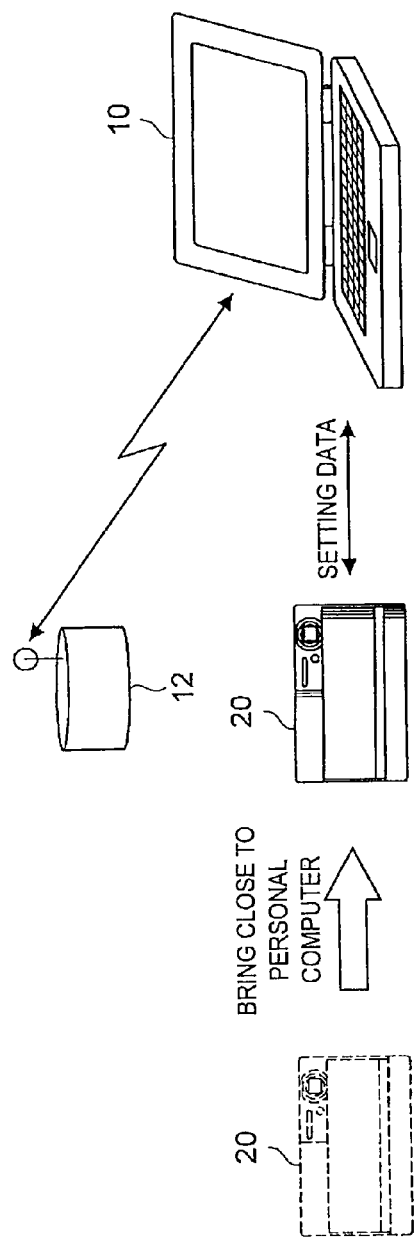
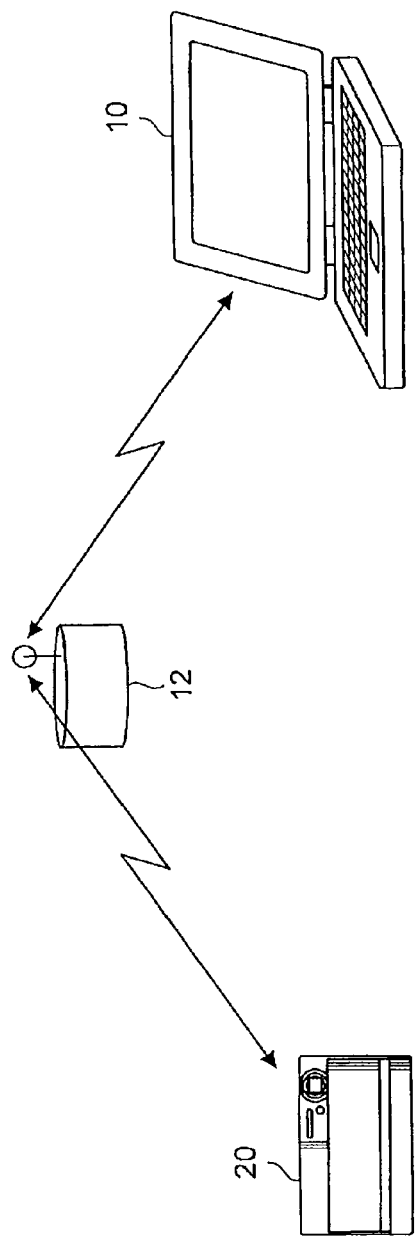

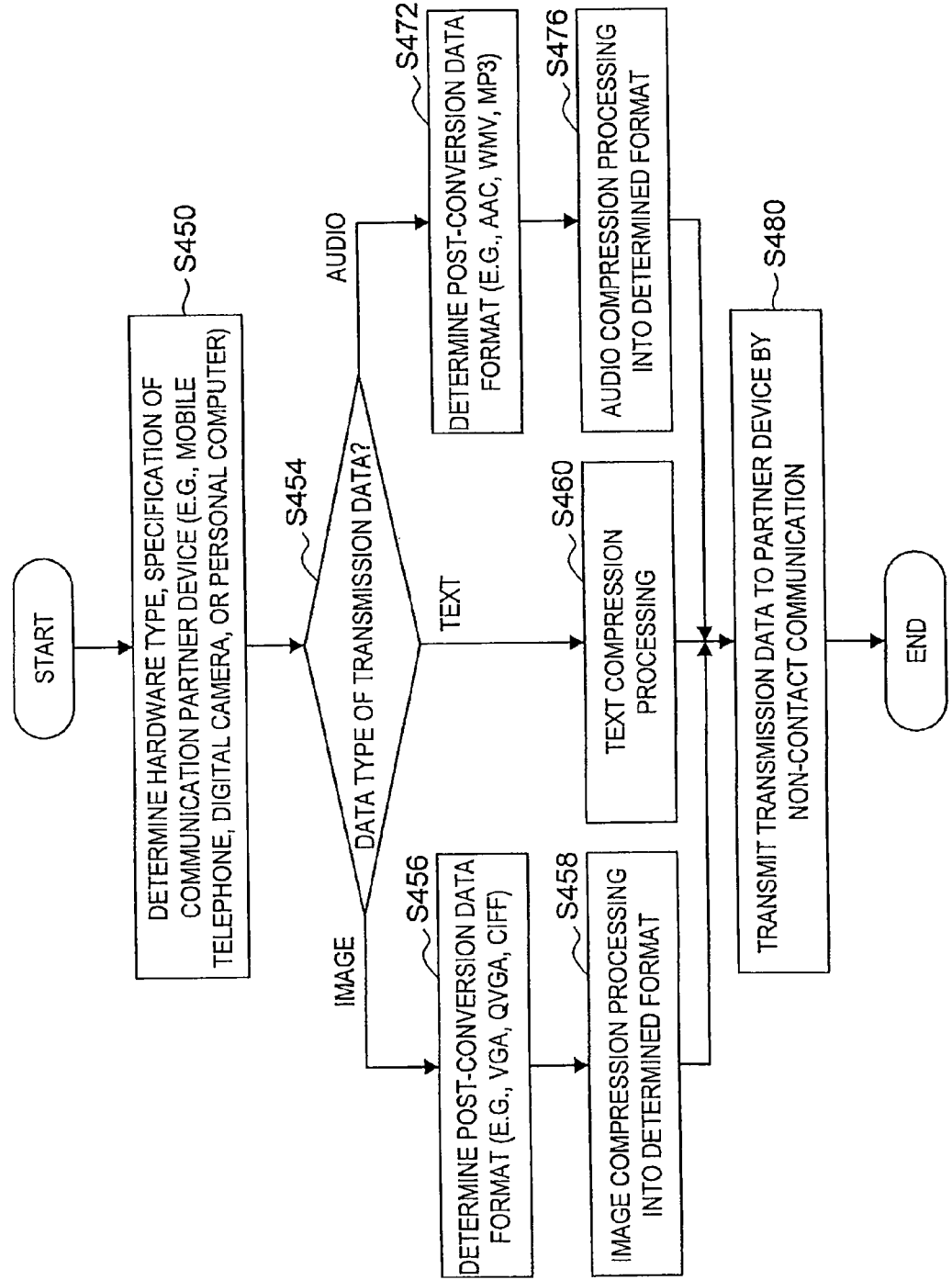

WIRELESS COMMUNICATION SYSTEM, WIRELESS COMMUNICATION DEVICE, PROGRAM, AND WIRELESS COMMUNICATION METHOD

CROSS REFERENCES TO RELATED APPLICATION(S)

The present invention contains subject matter related to Japanese Patent Application JP 2007-111018 filed in the Japan Patent Office on Apr. 19, 2007, the entire contents of which being incorporated herein by reference.

BACKGROUND OF THE INVENTION

1. Field of the Invention

The present invention relates to a wireless communication system, a wireless communication device, a program, and a wireless communication method.

2. Description of the Related Art

Recently, a non-contact communication method has been proposed that uses a terminal that is equipped with a non-contact integrated circuit (IC) chip and also uses a read/write unit that performs reading and writing of data from and to the terminal that is equipped with the non-contact IC chip. The non-contact communication method can perform data communication between the read/write unit and the terminal that is equipped with the non-contact IC chip when the two are brought into close proximity to one another.

Wireless communication technologies such as wireless local area networks (LANs), Bluetooth®, and the like have also come into widespread use. The wireless communication technologies can transmit and receive information among a plurality of wireless communication devices without connecting a plurality of communication devices by wire. The wireless communication technologies also have the advantage that the communication speed is generally higher than that of the non-contact communication method.

A wireless communication device that is compatible with both the non-contact communication method and the wireless communication technologies has been disclosed in Japanese Patent Application Publication No. JP-A-2002-204239, for example. Specifically, an information processing method is disclosed in Japanese Patent Application Publication No. JP-A-2002-204239 that uses non-contact communication to share, between a mobile telephone and a personal computer, setting data that are necessary for wireless communication between the mobile telephone and the personal computer and that establishes a wireless connection between the mobile telephone and the personal computer based on the setting data.

SUMMARY OF THE INVENTION

However, when the wireless communication device that is compatible with both the non-contact communication method and the wireless communication technologies uses the non-contact communication method to transmit data such as photographs, music, and the like in their existing form to an other communication device that is compatible only with the non-contact communication method, the communication time becomes long in some cases due to the volume of the data.

The present invention addresses the problem described above and provides a wireless communication system, a wireless communication device, a program, and a wireless communication method that are new and improved and that are capable of transmitting data in a short time according to a communication function that is provided in a communication partner device.

According to an embodiment of the present invention, there is provided a wireless communication system that includes a first wireless communication device and a second wireless communication device. The first wireless communication device includes a non-contact communication portion that transmits by a non-contact communication method unit specific data that indicate a communication function of the first wireless communication device. The second wireless communication device includes a first communication portion, a second communication portion, a determination portion, and a format conversion portion. The first communication portion receives the unit specific data that are transmitted from the first wireless communication device by the non-contact communication method. The second communication portion is capable of wireless communication at a faster communication speed than that of the first communication portion. The determination portion determines, based on the unit specific data, whether or not the first wireless communication device is equipped with a communication function that is compatible with the second communication portion. The format conversion portion converts a data format of transmission data that is transmitted to the first wireless communication device to a data format that reduces the data volume of the transmission data. If the determination portion determines that the first wireless communication device is not equipped with the communication function that is compatible with the second communication portion, the first communication portion transmits to the first wireless communication device the transmission data whose data format was converted by the format conversion portion.

As another way to address the problem described above, according to another embodiment of the present invention, there is provided a wireless communication device that includes a first communication portion, a second communication portion, a determination portion, and a format conversion portion. The first communication portion performs non-contact communication with an other wireless communication device and receives unit specific data that indicate a communication function of the other wireless communication device. The second communication portion is capable of wireless communication at a faster communication speed than that of the first communication portion. The determination portion determines, based on the unit specific data, whether or not the other wireless communication device is equipped with a communication function that is compatible with the second communication portion. The format conversion portion converts a data format of transmission data that is transmitted to the other wireless communication device to a data format that reduces the data volume of the transmission data. If the determination portion determines that the other wireless communication device is not equipped with the communication function that is compatible with the second communication portion, the first communication portion transmits to the other wireless communication device the transmission data whose data format was converted by the format conversion portion.

In this configuration, if the first communication portion receives from the other wireless communication device the unit specific data that indicate the communication function of the other wireless communication device, and if the determination portion determines that the other wireless communication device is not compatible with wireless communication at a faster communication speed than that of the first communication portion, the format conversion portion converts the data format of the transmission data that will be transmitted to the other wireless communication device, such that the data volume of the transmission data is reduced, and the first communication portion transmits to the other wireless communication device the transmission data whose data format was converted. That is, in a case where the other wireless communication device is not compatible with wireless communication at a faster communication speed than that of the first communication portion, the wireless communication device reduces the data volume of the transmission data and transmits it by non-contact communication. The wireless communication device can therefore control the communication time that is required to transmit the transmission data to the other wireless communication device.

The wireless communication device may also include a data format determination portion that determines, based on the unit specific data, what the data format of the transmission data will be after it is converted, and the format conversion portion may also convert the transmission data to the data format that was determined by the data format determination portion. In this configuration, the data format determination portion can determine the appropriate data format for the transmission data according to the unit specific data of the other wireless communication device, so the communication with the other wireless communication device can be made more efficient.

The unit specific data may also include information that indicates a hardware type of the other wireless communication device, and the data format determination portion may determine what the data format of the transmission data will be after it is converted, based on the hardware type of the other wireless communication device that is included in the unit specific data. This configuration makes it possible, in some cases, to determine what data format can be processed in the other wireless communication device, based on the hardware type of the other wireless communication device that is included in the unit specific data. There will also be cases where, even if the second communication portion of the wireless communication device transmits to the other wireless communication device by the wireless communication method the transmission data whose data format has not been converted, the other wireless communication device will not be able to use the transmission data, because the transmission data is in a data format that the other wireless communication device cannot process. Thus, having the data format determination portion determine the appropriate data format for the transmission data based on the hardware type of the other wireless communication device makes it possible for the first communication portion to transmit the transmission data that has been converted into a data format that is compatible with the other wireless communication device. Note that the unit specific data may also include information about software that is provided in the other wireless communication device. For example, in a case where decoding processing for the other wireless communication device to play back music is implemented in the form of software, the unit specific data may also include information about the software for music playback.

The unit specific data may also include information that indicates a compatible data format for the other wireless communication device, and the data format determination portion may determine, based on the unit specific data, that the data format of the transmission data after it is converted will be the compatible data format for the other wireless communication device. There will be some cases where, even if the second communication portion of the wireless communication device transmits to the other wireless communication device by the wireless communication method the transmission data whose data format has not been converted, the other wireless communication device will not be able to use the transmission data, because the transmission data is in a data format that the other wireless communication device cannot process. Thus, having the data format determination portion determine, based on the unit specific data, that the data format of the transmission data will be the compatible data format for the other wireless communication device makes it possible for the first communication portion to transmit the transmission data that has been converted into the compatible data format for the other wireless communication device.

The data format determination portion may also determine that the data format of the transmission data after it is converted will be a data format that makes the volume of the transmission data no greater than a specified volume. This configuration makes it possible, in a case where the first communication portion can transmit a specified volume of the transmission data per unit time, to control the time required to transmit the transmission data such that it will be no greater than a fixed length of time.

In a case where the determination portion determines that the other wireless communication device is equipped with the communication function that is compatible with the second communication portion, the second communication portion may transmit to the other wireless communication device the transmission data whose data format has not been converted by the format conversion portion. In a case where the wireless communication device can communicate with the other wireless communication device through the second communication portion, whose communication speed is faster than that of the first communication portion, this configuration makes it possible for the wireless communication device to transmit to the other wireless communication device in a comparatively short communication time the transmission data whose data volume has been maintained.

According to another embodiment of the present invention, there is provided a program that causes a computer to function as a wireless communication device that includes a first communication portion, a second communication portion, a determination portion, and a format conversion portion. The first communication portion performs non-contact communication with an other wireless communication device and receives unit specific data that indicate a communication function of the other wireless communication device. The second communication portion is capable of wireless communication at a faster communication speed than that of the first communication portion. The determination portion determines, based on the unit specific data, whether or not the other wireless communication device is equipped with a communication function that is compatible with the second communication portion. The format conversion portion converts a data format of transmission data that is transmitted to the other wireless communication device to a data format that reduces the data volume of the transmission data. If the determination portion determines that the other wireless communication device is not equipped with the communication function that is compatible with the second communication portion, the first communication portion transmits to the other wireless communication device the transmission data whose data format was converted by the format conversion portion.

The program can cause computer hardware resources, such as a CPU, a ROM, a RAM, and the like, for example, to perform the functions of the determination portion, the format conversion portion, and the like. That is, it is possible to make a computer that uses the program function as the wireless communication device described above.

According to another embodiment of the present invention, there is provided a wireless communication method. The wireless communication method includes a step of receiving from an other wireless communication device, by using a non-contact communication method, unit specific data that indicate a communication function of the other wireless communication device. The wireless communication method also includes a step of determining, based on the unit specific data, whether or not the other wireless communication device is compatible with a wireless communication method whose communication speed is faster than that of the non-contact communication method. The wireless communication method also includes a step of converting a data format of transmission data that is transmitted to the other wireless communication device to a data format that reduces the data volume of the transmission data, if it is determined that the other wireless communication device is not compatible with the wireless communication method. The wireless communication method also includes a step of transmitting to the other wireless communication device, using the non-contact communication method, the transmission data whose data format was converted.

According to the embodiments of the present invention described above, data can be transmitted in a short time according to a communication function that is provided in a communication partner device.

BRIEF DESCRIPTION OF THE DRAWINGS

FIG. 1 is an explanatory figure that shows an example of an overall configuration of a wireless communication system according to an embodiment of the present invention;

FIG. 8 is a flowchart that shows a flow of operations in a data format determination portion and a format conversion portion.

DETAILED DESCRIPTION OF THE PREFERRED EMBODIMENTS

Figure 2:
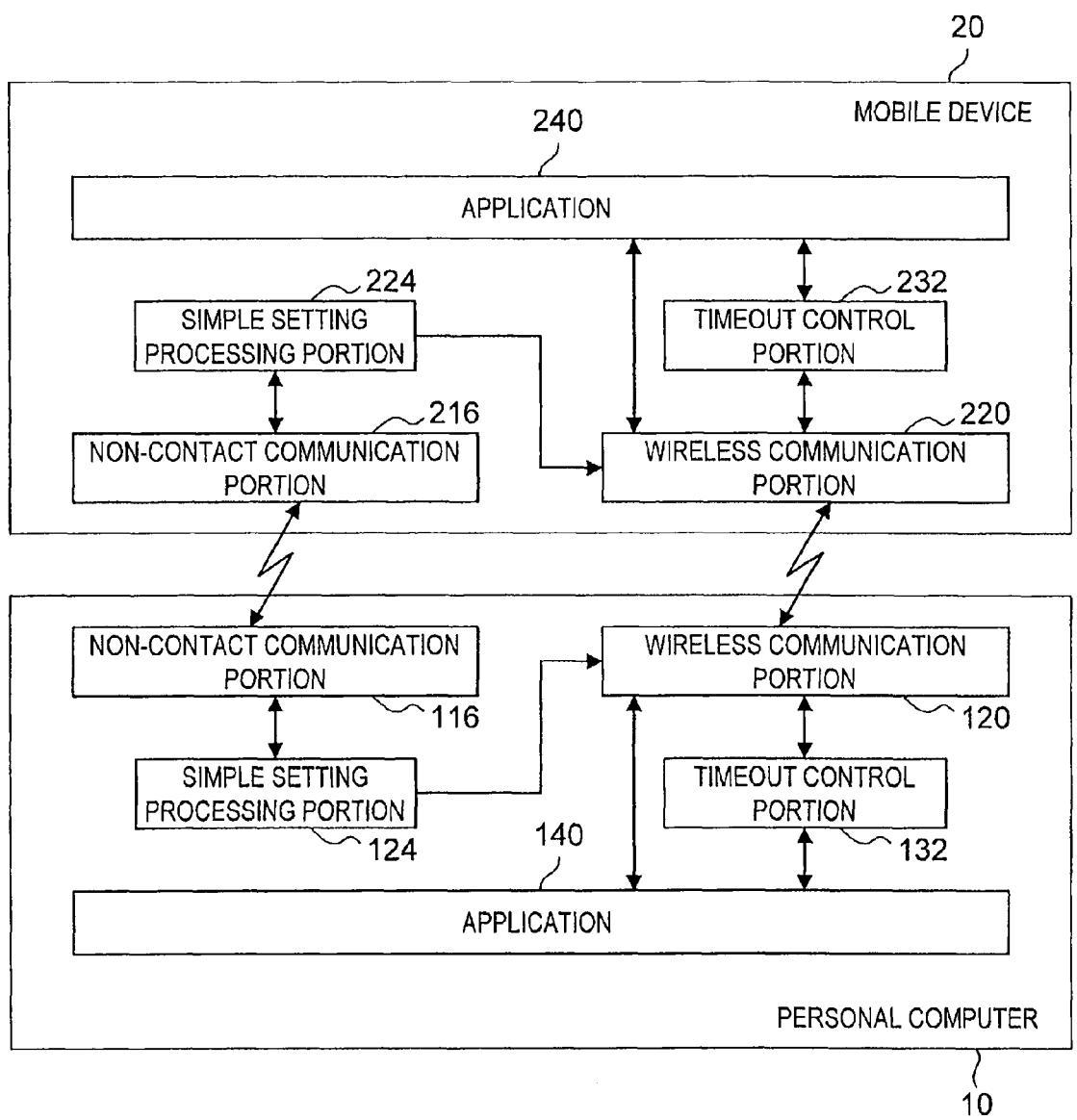
FIG. 2 is a functional block diagram that shows basic configurations of a personal computer and a mobile device according to the embodiment.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be explained in the order shown below.

1. Overview of wireless communication system according to the present embodiment
 1-1. Basic configuration of wireless communication device according to the present embodiment
 1-2. Operation of the wireless communication system according to the present embodiment
2. Explanation of the wireless communication device according to the present embodiment
 2-1. Advantages of the present embodiment
 2-2. Hardware configuration of the wireless communication device according to the present embodiment
 2-3. Functional configuration of the wireless communication device according to the present embodiment
 2-4. Wireless communication method that is executed in the wireless communication device according to the present embodiment
3. Conclusion 1. Overview of Wireless Communication System According To the Present Embodiment First, an overview of a wireless communication system according to the present embodiment will be explained with reference to FIG. 1. A wireless communication system 1 can easily perform wireless communication among a plurality of wireless communication devices.

FIG. 1 is an explanatory figure that shows an example of an overall configuration of the wireless communication system 1 according to the present embodiment. The wireless communication system 1 includes a personal computer 10, a wireless base station 12, and a mobile device 20.

The personal computer 10 and the mobile device 20 are each a wireless communication device that is equipped with a non-contact communication function and a wireless communication function. The wireless communication function may be, for example, a wireless local area network (LAN), Bluetooth®, or the like. FIG. 1A shows a state in which the personal computer 10 is connected to the wireless base station 12 by a wireless LAN.

If, at this time, the mobile device 20 is brought into close proximity to the personal computer 10, the mobile device 20 and the personal computer 10 will perform non-contact communication. Based on the non-contact communication, the mobile device 20 will then acquire from the personal computer 10 setting data that are necessary for wireless communication with the personal computer 10.

Thereafter, the mobile device 20 can achieve wireless communication with the personal computer 10 through the wireless base station 12, as shown in FIG. 1B, based on the setting data that were acquired from the personal computer 10. That is, in the wireless communication system 1, a task by which a user of the mobile device 20 manually inputs the setting data to the mobile device 20 can be eliminated.

Note that in FIG. 1, the personal computer 10 and the mobile device 20 are shown merely as examples of the wireless communication device. The wireless communication device may also be an information processing device such as a home video processing device (a DVD recorder, a video deck, or the like), a mobile telephone, a Personal Handyphone System (PHS), a mobile music playback device, a mobile video processing device, a personal digital assistant (PDA), a home game device, a mobile game device, a household electrical appliance, or the like.

Further, FIG. 1 shows a case in which the personal computer 10 and the mobile device 20 are wirelessly connected through the wireless base station 12, but the present embodiment is not limited to this example. For example, the personal computer 10 and the mobile device 20 may also be connected directly in an ad hoc manner.

Furthermore, a case has been explained above in which the mobile device 20 acquires the setting data by being brought into close proximity to the personal computer 10, but bringing the mobile device 20 into close proximity to the personal computer 10 may also allow the personal computer 10 to acquire the setting data and to use the setting data to establish a wireless connection with the mobile device 20.

1-1. Basic Configuration of Wireless Communication Device According to the Present Embodiment Next, basic configurations of the personal computer 10 and the mobile device 20 as examples of the wireless communication device according to the present embodiment will be explained with reference to FIG. 2.

FIG. 2 is a functional block diagram that shows the basic configurations of the personal computer 10 and the mobile device 20 according to the present embodiment. The personal computer 10 includes a non-contact communication portion 116, a wireless communication portion 120, a simple setting processing portion 124, a timeout control portion 132, and an application 140. The mobile device 20 includes a non-contact communication portion 216, a wireless communication portion 220, a simple setting processing portion 224, a timeout control portion 232, and an application 240.

The non-contact communication portion 116 is a non-contact communication interface with the mobile device 20 and, in some cases, functions as a reader/writer that communicates the setting data, as well as unit specific data that indicate the communication functions of the personal computer 10 and the mobile device 20, to the mobile device 20. For example, the non-contact communication portion 116 can transmit radio waves that travel a short distance of approximately 10 centimeters, driving the non-contact communication portion 216 of the mobile device 20 that is within the radio transmission footprint and communicating with the non-contact communication portion 216 of the mobile device 20. The non-contact communication portion 116 may also actually include an antenna and a control portion that controls communication that uses the antenna.

The wireless communication portion 120 is an interface for wireless communication with the mobile device 20. That is, the wireless communication portion 120, after establishing a wireless connection with the wireless communication portion 220 of the mobile device 20, based on an operation of the simple setting processing portion 124, can transmit and receive any type of data to and from the mobile device 20. The wireless communication portion 120 may be compatible with a wireless LAN and may also be compatible with Bluetooth®. The wireless communication portion 120 may also include an antenna, an IC chip, and software that controls the IC chip and permits the wireless communication portion 120 to transmit and receive any type of data.

The simple setting processing portion 124 performs processing for making a wireless connection between the wireless communication portion 120 of the personal computer 10 and the wireless communication portion 220 of the mobile device 20. For example, in a case where the wireless communication portion 120 is connected to the wireless base station 12, the simple setting processing portion 124 transmits to the non-contact communication portion 116 the setting data that include a base station ID, a network ID, and the like. The simple setting processing portion 124 also makes the wireless connection between the wireless communication portion 120 and the wireless communication portion 220 of the mobile device 20 based on the setting data that are received through the non-contact communication portion 116.

The timeout control portion 132 functions as a communication cutoff portion that cuts off the wireless connection between the wireless communication portion 120 and the wireless communication portion 220 of the mobile device 20. Electric power is necessary to make the wireless connection between the personal computer 10 and the mobile device 20, so maintaining the wireless connection between the personal computer 10 and the mobile device 20 even while data communication between the personal computer 10 and the mobile device 20 is not actually being performed gives rise to excessive power consumption. Accordingly, by cutting off the wireless connection between the personal computer 10 and the mobile device 20 if no data communication is actually performed between the personal computer 10 and the mobile device 20 for a specified time interval, such as one hour, thirty minutes, or the like, for example, the timeout control portion 132 can contribute to reducing the amount of electric power that is consumed.

The application 140 is software for achieving a specific purpose. For example, the application 140 may be a data editing application, and it may be a communication application, and it may be a program execution application.

The non-contact communication portion 216 is a non-contact communication interface with the personal computer 10 and functions as a first communication portion that communicates the setting data, as well as the unit specific data that indicate the communication functions of the personal computer 10 and the mobile device 20, to the personal computer 10. For example, the non-contact communication portion 216 can be driven by the radio waves that are transmitted from the non-contact communication portion 116 of the personal computer 10 and can communicate with the non-contact communication portion 116 of the personal computer 10. The non-contact communication portion 216 may also actually include an antenna, an IC chip, and software that controls the IC chip and permits the non-contact communication portion 216 to transmit and receive any type of data.

The wireless communication portion 220 is an interface for wireless communication with the personal computer 10 and functions as a second communication portion. That is, the wireless communication portion 220, after establishing a wireless connection with the wireless communication portion 120 of the personal computer 10, based on an operation of the simple setting processing portion 224, can transmit and receive any type of data to and from the personal computer 10. The wireless communication portion 220 may be compatible with a wireless LAN and may also be compatible with Bluetooth®. The wireless communication portion 220 may also include an antenna, an IC chip, and software that controls the IC chip and permits the wireless communication portion 220 to transmit and receive any type of data.

The simple setting processing portion 224 performs processing for making the wireless connection between the wireless communication portion 120 of the personal computer 10 and the wireless communication portion 220 of the mobile device 20. For example, in a case where the wireless communication portion 120 of the personal computer 10 is connected to the wireless base station 12, the simple setting processing portion 224 receives, through the non-contact communication portion 216, the setting data that include the base station ID, the network ID, and the like. The simple setting processing portion 224 also makes the wireless connection between the wireless communication portion 120 of the personal computer 10 and the wireless communication portion 220 of the mobile device 20 based on the setting data that are received through the non-contact communication portion 216.

The timeout control portion 232 functions as a communication cutoff portion that cuts off the wireless connection between the wireless communication portion 120 of the personal computer 10 and the wireless communication portion 220 of the mobile device 20. Electric power is necessary to make the wireless connection between the personal computer 10 and the mobile device 20, so wirelessly connecting the personal computer 10 and the mobile device 20 even while data communication between the personal computer 10 and the mobile device 20 is not actually being performed gives rise to excessive power consumption. Accordingly, the timeout control portion 232 can, for example, count the time that elapses after data communication is actually performed between the personal computer 10 and the mobile device 20, and when the count reaches a specified value, the timeout control portion 232 can cut off the wireless connection between the personal computer 10 and the mobile device 20, thus contributing to reducing the amount of electric power that is consumed.

The application 240 is software for achieving a specific purpose. For example, the application 240 may be a data editing application, and it may be a communication application, and it may be a program execution application. Data communication between the application 240 and the application 140 of the personal computer 10 can be performed through the wireless communication portion 120 and the wireless communication portion 220, for example.

1-2. Operation of the Wireless Communication System According to the Present Embodiment Next, a flow of processing in the wireless communication system 1 according to the present embodiment up to the establishing of the wireless connection between the personal computer 10 and the mobile device 20 will be explained with reference to FIG. 3.

Figure 3:
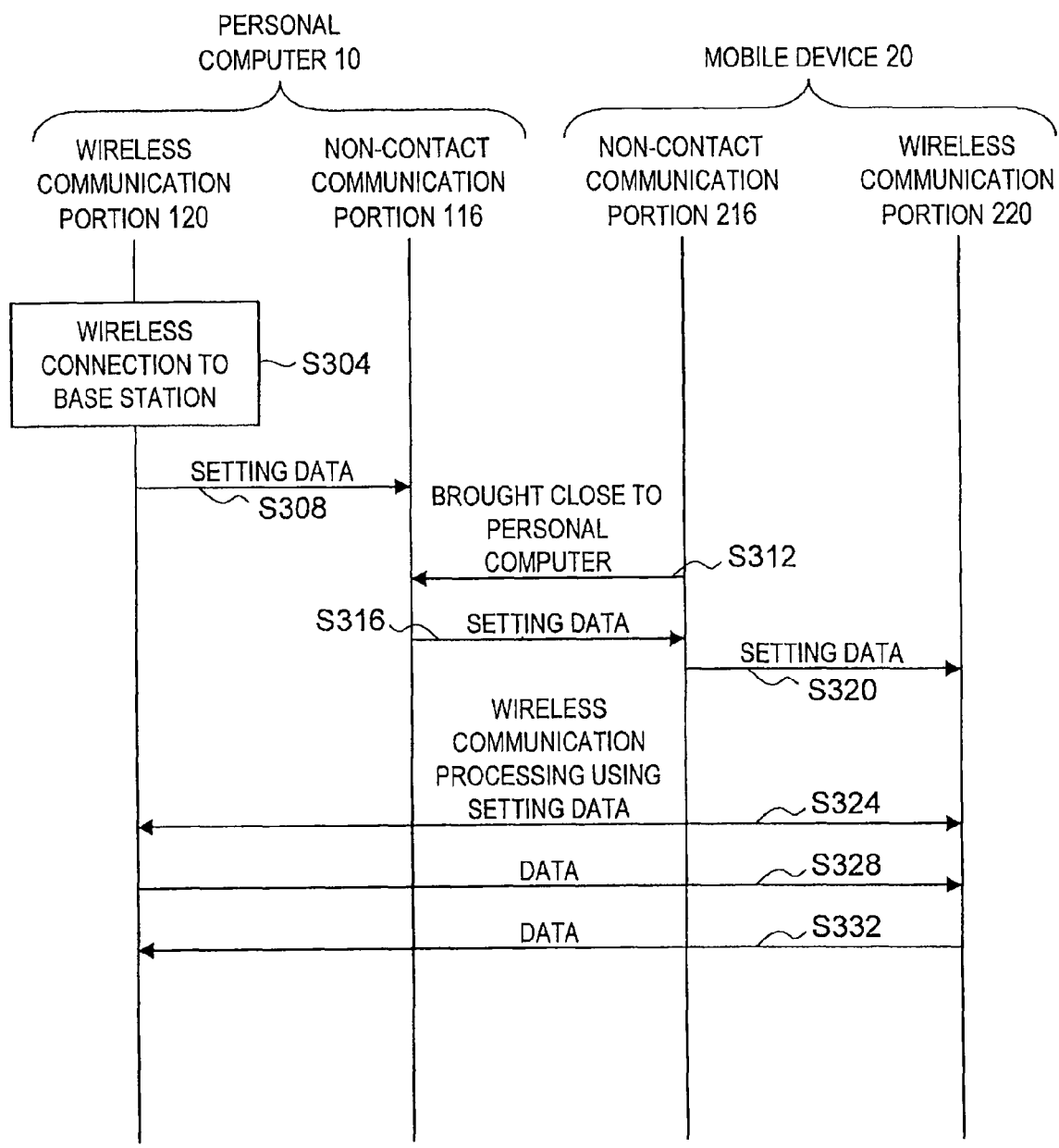
FIG. 3 is a sequence chart that shows a flow of a wireless communication method that is executed in the wireless communication system according to the embodiment.

FIG. 3 is a sequence chart that shows a flow of a wireless communication method that is executed in the wireless communication system 1 according to the present embodiment. First, when the wireless communication portion 120 of the personal computer 10 makes the wireless connection to the wireless base station 12 (step S304), the setting data are output to the non-contact communication portion 116 through the simple setting processing portion 124 (step S308). Next, when the mobile device 20 is brought into close proximity to the personal computer 10 (step S312), the non-contact communication portion 116 of the personal computer 10 transmits the setting data to the non-contact communication portion 216 of the mobile device 20 (step S316).

Next, the simple setting processing portion 224 of the mobile device 20 outputs to the wireless communication portion 220 the setting data that were received by the non-contact communication portion 216 (step S320). The simple setting processing portion 224 of the mobile device 20 then uses the setting data in performing processing to make the wireless connection between the wireless communication portion 220 of the mobile device 20 and the wireless communication portion 120 of the personal computer 10 (step S324). Note that the wireless connection processing includes, for example, mutual recognition processing between the mobile device 20 and the personal computer 10.

Next, when the wireless connection is made between the personal computer 10 and the mobile device 20, any type of data is transmitted and received between the wireless communication portion 120 of the personal computer 10 and the wireless communication portion 220 of the mobile device 20 (steps S328, S332).

Thus the wireless communication system 1 is effective in that it can make the wireless connection between the personal computer 10 and the mobile device 20 without forcing the user of the mobile device 20 to perform an operation to input the setting data.

2. Explanation of the Wireless Communication Device According to the Present Embodiment Next, a detailed explanation will be provided of the advantages, the particular configurations, and the like of the personal computer 10 and the mobile device 20 as examples of the wireless communication device according to the present embodiment.

2-1. Advantages of the Present Embodiment

In some cases, the communication speed of the non-contact communication described above is slower than that of wireless communication through a wireless LAN, Bluetooth®, and the like. Therefore, in a case where the user wants to transmit data from the mobile device 20 described above to a wireless communication device that is not equipped with the wireless communication function, the communication time may become long due to the volume of the transmitted data. This will be explained in detail below with reference to FIG. 4.

Figure 4:
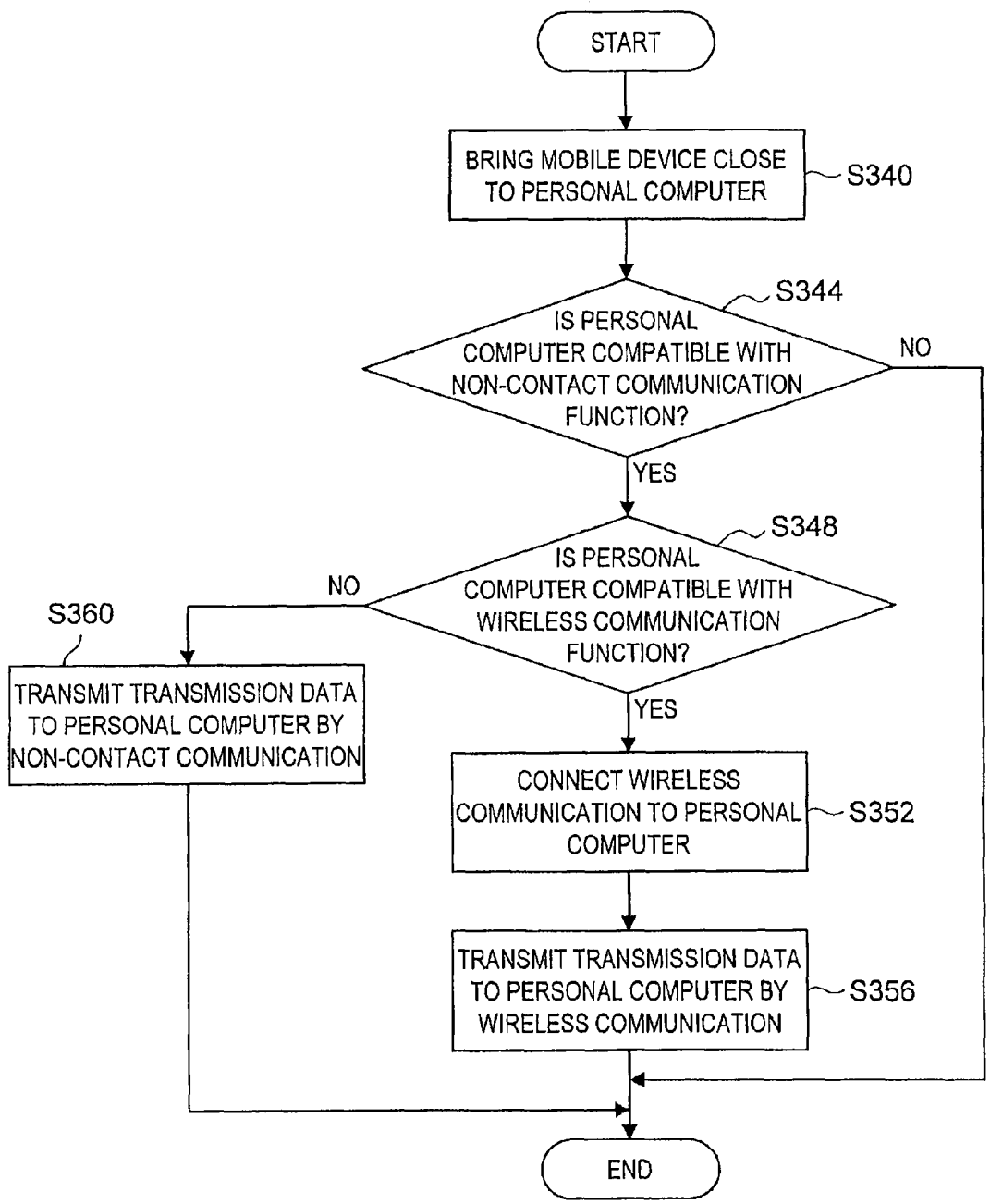
FIG. 4 is a flowchart that shows a flow of a data transmission from the mobile device to the personal computer as an example of an other wireless communication device.

FIG. 4 is a flowchart that shows a flow of a data transmission from the mobile device 20 to the personal computer 10 as an example of an other wireless communication device. First, the mobile device 20 is brought into close proximity to the personal computer 10 (step S340). Next, if the personal computer 10 is compatible with non-contact communication (step S344), the processing determines whether or not the personal computer 10 is compatible with the wireless communication function, based on the unit specific data that are received by the non-contact communication, for example (step S348).

In a case where it is determined that the personal computer 10 is compatible with the wireless communication function, the mobile device 20 makes a wireless connection to the personal computer 10 using the setting data (step S352) and transmits to the personal computer 10 by wireless communication (step S356). On the other hand, in a case where it is determined that the personal computer 10 is not compatible with the wireless communication function, the mobile device 20 transmits data to the personal computer 10 by non-contact communication (step S360).

Thus, in a case where a communication partner device of the mobile device 20 is not compatible with the wireless communication function, if the mobile device 20 transmits data to the communication partner device by non-contact communication, the data transmission time will become quite long, because the communication speed of the non-contact communication is comparatively slow.

The mobile device 20 according to the present embodiment was created with this situation in mind. In a case where the communication partner device is compatible only with the non-contact communication method, the mobile device 20 according to the present embodiment can transmit a reduced volume of transmission data in an effort to limit the communication time. The configuration and operation of the mobile device 20 will be explained in detail below.

Figure 5:
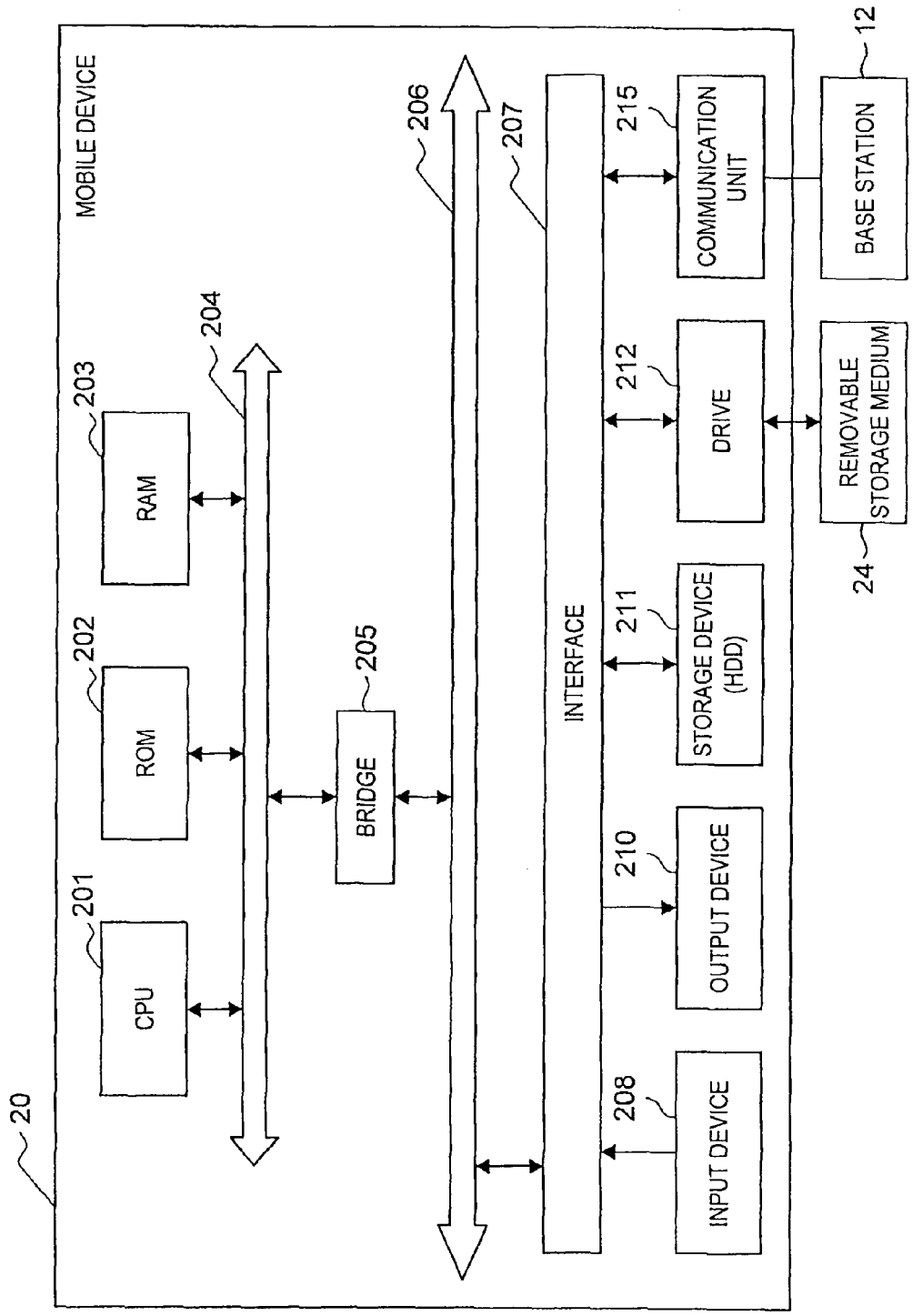
FIG. 5 is a block diagram that shows a hardware configuration of the mobile device according to the embodiment.

2-2. Hardware Configuration of the Wireless Communication Device According to the Present Embodiment FIG. 5 is a block diagram that shows a hardware configuration of the mobile device 20 according to the present embodiment. The mobile device 20 includes a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212, and a communication unit 215.

The CPU 201 functions as a computation processing unit and as a control unit, and it controls the overall operation of the mobile device 20 according to various types of programs. The CPU 201 may also be a microprocessor. The ROM 202 stores programs, computation parameters, and the like that are used by the CPU 201. The RAM 203 serves as a primary storage site for the programs that the CPU 201 executes, as well as for parameters and the like that are changed as necessary in the execution of the programs. The CPU 201, the ROM 202, and the RAM 203 are interconnected through the host bus 204, which is configured from a CPU bus and the like.

The host bus 204 is connected through the bridge 205 to the external bus 206, which is a Peripheral Component Interconnect/Interface (PCI) bus or the like. Note that it is not absolutely necessary for the host bus 204, the bridge 205, and the external bus 206 to be configured separately, and their functions may also be incorporated into one bus.

The input device 208 is configured from an input portion, an input control circuit, and the like. The input portion allows the user to input information and may be a mouse, a keyboard, a touch panel, a button, a microphone, a switch, a lever, or the like, for example. The input control circuit creates an input signal based on the input by the user and outputs the signal to the CPU 201. The user of the mobile device 20 can command processing operations by inputting various types of data to the mobile device 20 by operating the input device 208.

The output device 210 may be configured from a display device and an audio output device, for example. The display device may be a cathode ray tube (CRT) display device, a liquid crystal display (LCD) device, a lamp, or the like. The audio output device may be a speaker, headphones, or the like. The output device 210 outputs played-back content, for example. Specifically, the display device displays various types of information such as played-back visual data and the like as text and images. The audio output device, on the other hand, converts played-back audio data and the like into sound.

The storage device 211 is a data storage device that is configured as an example of a storage portion of the mobile device 20 according to the present embodiment. The storage device 211 can include a storage medium, a recording device that records data in the storage medium, a readout device that reads out the data from the storage medium, and a deletion device that deletes the data from the storage medium. The storage device 211 can be configured from a hard disk drive (HDD), for example. The storage device 211 drives the hard disk and stores in it programs that are executed by the CPU 201 and various types of data. The storage device 211 also stores the setting data and the unit specific data.

The drive 212 is a reader/writer for a storage medium and is either built into the mobile device 20 or mounted externally. The drive 212 reads information that is recorded in a removable storage medium 24 that is mounted in the drive 212, such as a magnetic disk, an optical disk, a magneto optical disk, a semiconductor memory, or the like, and outputs the information to the RAM 203.

The communication unit 215 is a communication interface that is configured from a communication device or the like for connecting to the wireless base station 12. The communication unit 215 may be a wireless LAN-compatible communication device, a wireless USB-compatible communication device, a wired communication device that performs communication by wire, a non-contact communication-compatible communication device, or a combination of a plurality of these devices. The communication unit 215 transmits and receives any type of data to and from the wireless base station 12 and an other wireless communication device. Note that the hardware configuration of the personal computer 10 can be configured to be substantially the same as that of the mobile device 20, so an explanation of the hardware configuration of the personal computer 10 will be omitted.

Figure 6:
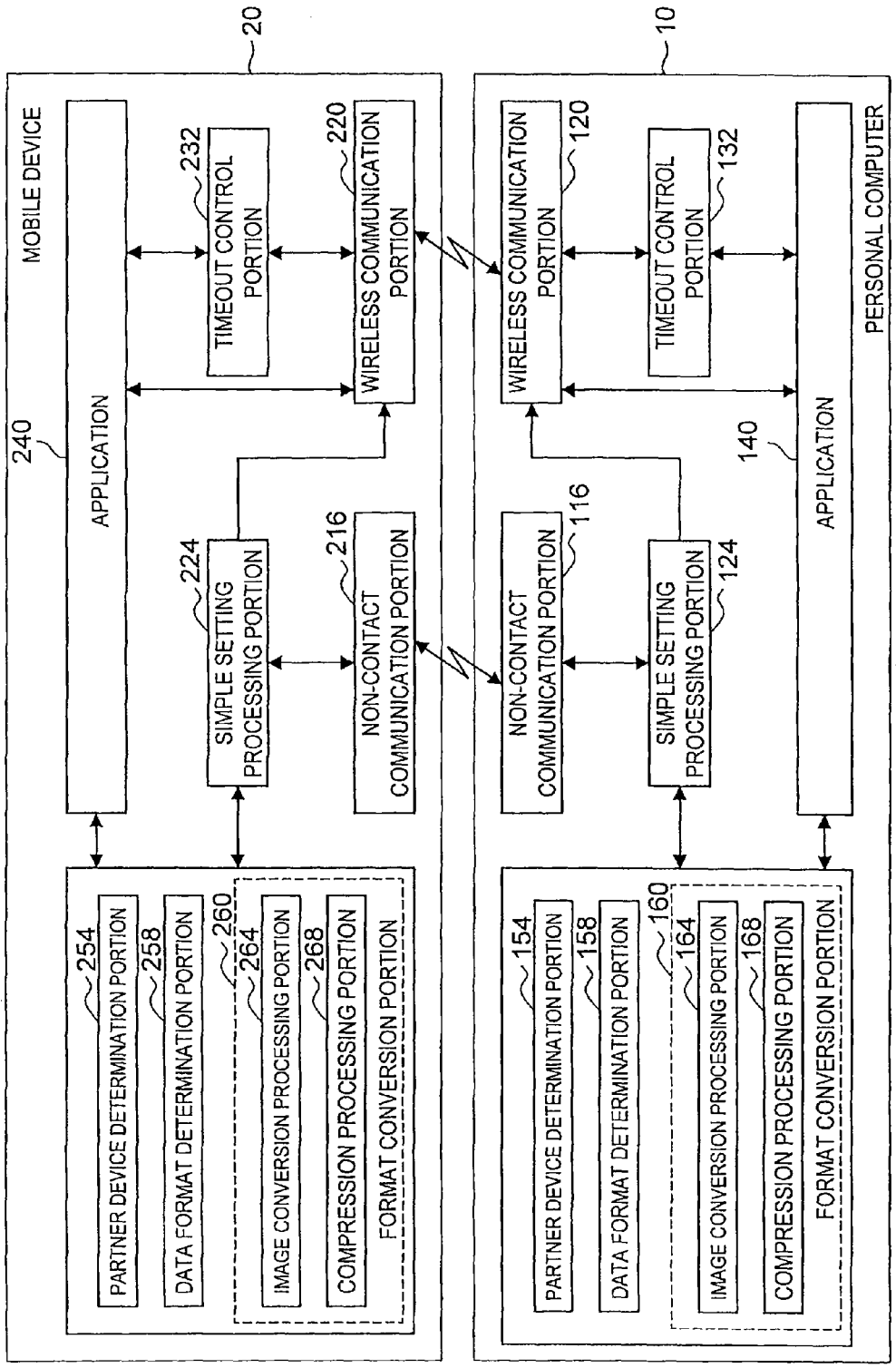
FIG. 6 is a functional block diagram that shows configurations of the personal computer and the mobile device according to the embodiment.

2-3. Functional Configuration of the Wireless Communication Device According to the Present Embodiment FIG. 6 is a functional block diagram that shows configurations of the personal computer 10 and the mobile device 20 as examples of the wireless communication device according to the present embodiment. The personal computer 10 includes the non-contact communication portion 116, the wireless communication portion 120, the simple setting processing portion 124, the timeout control portion 132, the application 140, a partner device determination portion 154, a data format determination portion 158, and a format conversion portion 160. The mobile device 20 includes the non-contact communication portion 216, the wireless communication portion 220, the simple setting processing portion 224, the timeout control portion 232, the application 240, a partner device determination portion 254, a data format determination portion 258, and a format conversion portion 260. Many parts of the configurations of the personal computer 10 and the mobile device 20 are duplicates of the content that was explained with reference to FIG. 2, so the configurations of the personal computer 10 and the mobile device 20 will be explained with an emphasis on the parts that are different from the content explained with reference to FIG. 2.

The partner device determination portion 154 functions as a determination portion that determines whether or not the communication partner device is equipped with the wireless communication function that is compatible with the wireless communication portion 120, based on the unit specific data for the communication partner device that are received through the non-contact communication portion 116. The unit specific data may be data that include information that indicates a communication function with which the communication partner device is equipped, a hardware type (digital camera, mobile audio player, mobile telephone, or the like), and a compatible data format. Note that the communication speed of the wireless communication by the wireless communication portion 120 is faster than the communication speed of the non-contact communication by the non-contact communication portion 116.

In a case where it is determined by the partner device determination portion 154 that the communication partner device is not equipped with the wireless communication function, it is necessary to transmit the transmission data through the non-contact communication portion 116, which has a slow communication speed. Accordingly, in a case where it is determined by the partner device determination portion 154 that the communication partner device is not equipped with the wireless communication function, the data format determination portion 158 determines a data format that will reduce the volume of the transmission data.

The format conversion portion 160 converts the transmission data to the data format that was determined by the data format determination portion 158. For example, in a case where the transmission data is image data, an image conversion processing portion 164 performs processing that converts the data format of the image data. In a case where the transmission data is text data, a compression processing portion 168 performs processing that compresses the text data. Note that the transmission data may be a command from the application 140 or data that is input.

The transmission data may also include audio data such as music, a lecture, a radio program, or the like, visual data such as a motion picture, a television program, a video program, a photograph, a document, a painting, a diagram, or the like, and any other type of data, such as a game, software, or the like.

In the same manner, the partner device determination portion 254 of the mobile device 20 functions as a determination portion that determines whether or not the communication partner device is equipped with the wireless communication function that is compatible with the wireless communication portion 220, based on the unit specific data for the communication partner device that are received through the non-contact communication portion 216. The unit specific data may be data that include information that indicates a communication function that the communication partner device has, a hardware type (personal computer, mobile game unit, or the like), a compatible data format, and an application type. Note that the communication speed of the wireless communication by the wireless communication portion 220 is faster than the communication speed of the non-contact communication by the non-contact communication portion 216.

In a case where it is determined by the partner device determination portion 254 that the communication partner device is not equipped with the wireless communication function, it is necessary to transmit the transmission data through the non-contact communication portion 216, which has a slow communication speed. Accordingly, in a case where it is determined by the partner device determination portion 254 that the communication partner device is not equipped with the wireless communication function, the data format determination portion 258 determines a data format that will reduce the volume of the transmission data.

The format conversion portion 260 converts the transmission data to the data format that was determined by the data format determination portion 258. For example, in a case where the transmission data is image data, an image conversion processing portion 264 performs processing that converts the data format of the image data. In a case where the transmission data is text data, a compression processing portion 268 performs processing that compresses the text data. Note that the transmission data may be a command from the application 240 or input data that is input.

The data format of the transmission data may be Joint Photographic Experts Group (JPEG), Moving Picture Experts group 1 (MPEG1), MPEG2, MPEG4, and the like for image compression formats and MPEG1 Audio Layer 3 (MP3), Advanced Audio Coding (AAC), Linear PCM (LPCM), Windows Media Audio 9 (WMA9), Adaptive Transform Acoustic Coding (ATRAC), ATRAC3, and the like for audio compression formats. The data format conversion for the transmission data may also include lowering the bit rate (from 160 kbps to 120 kbps, for example), converting document data to a PDF file, and the like.

The data format determination portion 258 may determine the data format of the transmission data based on the unit specific data that was received through the non-contact communication portion 216, which include information that indicates a hardware type, a compatible data format, a specification, or the like for the communication partner device. For example, in a case where the communication partner device is a mobile telephone, the data format determination portion 258 may determine that the device's data storage capacity is low or that the device is compatible only with a specified data format. Thus the data format determination portion 258 may determine that the data format for the transmission data will be the data format with the highest compression ratio or the specified data format.

Based on the unit specific data, the data format determination portion 258 may also determine that the data format for the transmission data will be the compatible data format for the communication partner device. This configuration makes it possible to prevent a case in which the communication partner device cannot use the transmission data that was transmitted from the mobile device 20, even though the communication partner device received the transmission data.

The data format determination portion 258 may also determine that the data format for the transmission data will be a data format that makes the volume of the transmission data no greater than a specified volume. This configuration makes it possible to keep the communication time that is required to transmit the transmission data within a specified time limit in a case where the non-contact communication portion 216 communicates at a stable communication speed. The data format determination portion 258 may also determine, based on the unit specific data, that the volume of the transmission data will be suppressed by conversion to a compressed format or will be suppressed by lowering the bit rate. For example, in a case where the transmission data is image data, the data format determination portion 258 may select an image compression format that suppresses the data volume and may also choose to lower the bit rate. In the same manner, in a case where the transmission data is audio data, the data format determination portion 258 may select an audio compression format that suppresses the data volume and may also choose to lower the bit rate.

Note that in a case where it is determined by the partner device determination portion 254 that the communication partner device is equipped with the wireless communication function, the transmission data may be transmitted to the communication partner device through the wireless communication portion 220 without any conversion of the data format. In a case where the communication partner device is compatible with wireless communication, the communication speed of which is faster than that of non-contact communication, this configuration makes it possible to transmit to the communication partner device in a comparatively short time the transmission data for which the data volume has been maintained.

In FIG. 6, the personal computer 10 and the mobile device 20 are both equipped with the wireless communication function, so the transmission data can be transmitted and received between the personal computer 10 and the mobile device 20 without any conversion of the data format.

Figure 7:
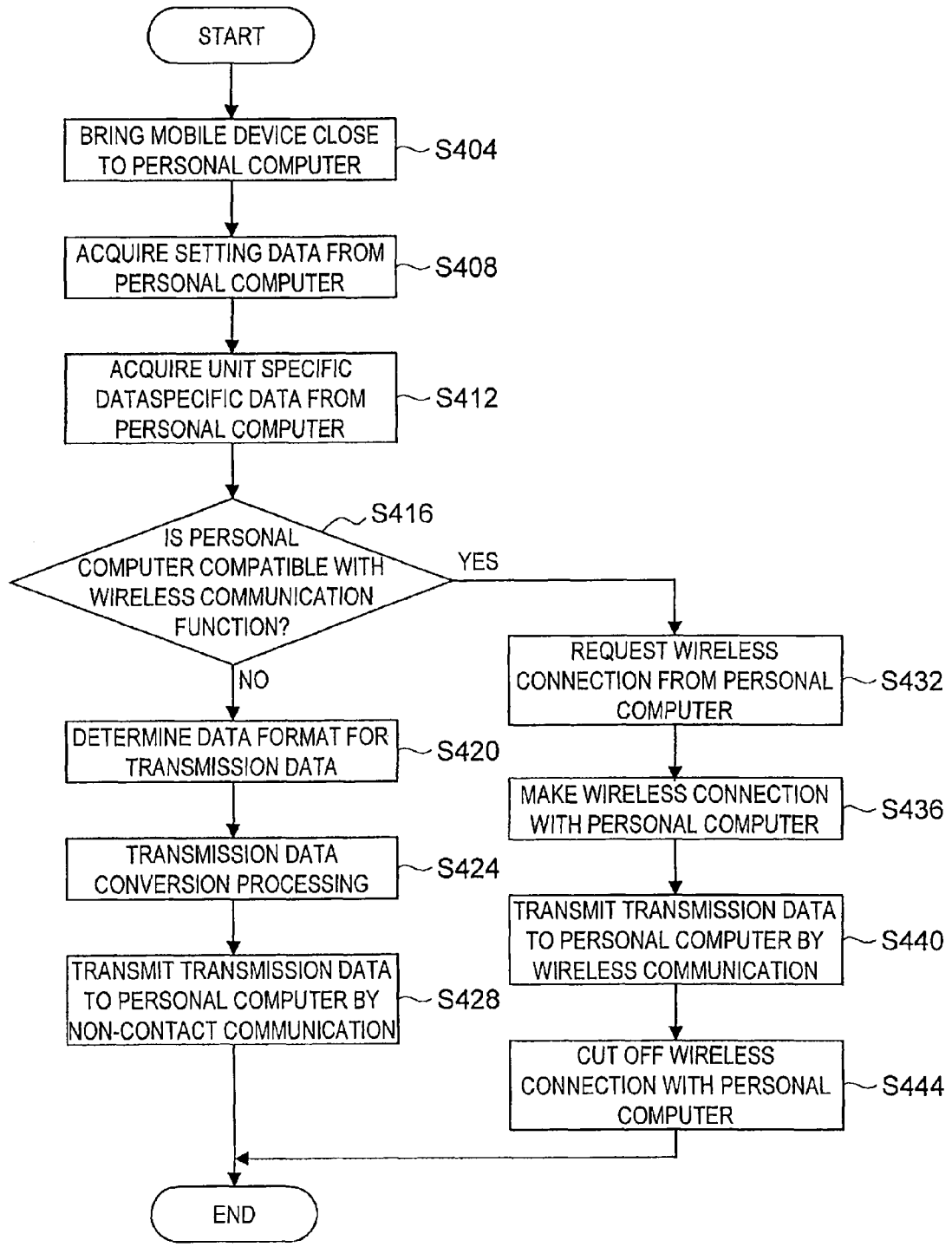
FIG. 7 is a flowchart that shows a flow of a wireless communication method that is executed in the mobile device according to the embodiment.

2-4. Wireless Communication Method that is Executed in the Wireless Communication Device According to the Present Embodiment FIG. 7 is a flowchart that shows a flow of a wireless communication method that is executed in the mobile device 20 according to the embodiment. First, the mobile device 20 is brought into close proximity to the personal computer 10 as an example of the communication partner device (step S404). Then the mobile device 20 acquires from the personal computer 10 the setting data (step S408) and the unit specific data (step S412).

Next, the partner device determination portion 254 of the mobile device 20 determines whether or not the setting data were acquired and, based on the acquired unit specific data, whether or not the personal computer 10 is compatible with the wireless communication function (step S416). In a case where it is determined that the personal computer 10 is not compatible with the wireless communication function, the data format determination portion 258 determines the data format for the transmission data (step S420), and the format conversion portion 260 converts the transmission data to the data format that was determined by the data format determination portion 258 (step S424). Then the transmission data whose data format was converted by the format conversion portion 260 is transmitted to the personal computer 10 through the non-contact communication portion 216 (step S428).

On the other hand, in a case where it is determined at step S416 that the personal computer 10 is compatible with the wireless communication function, the simple setting processing portion 224 performs processing to request a wireless connection to the personal computer 10 based on the setting data (step S432). When the wireless connection to the personal computer 10 is successfully made (step S436), the wireless communication portion 220 transmits the transmission data to the personal computer 10 (step S440). Then, if no actual wireless communication is carried out between the mobile device 20 and the personal computer 10 for a specified period of time, the timeout control portion 232 cuts off the wireless connection between the mobile device 20 and the personal computer 10 (step S444).

FIG. 8 is a flowchart that shows a flow of operations in the data format determination portion 258 and the format conversion portion 260. First, the data format determination portion 258 determines the hardware type, the specification, and the like of the communication partner device, based on the acquired unit specific data (step S450). For example, the data format determination portion 258 determines whether the communication partner device is a mobile telephone, a digital camera, a personal computer, or the like, and whether the communication partner device is compatible with AAC, compatible with MPEG4, and the like.

Next, the data format determination portion 258 determines what type of data the transmission data is (step S454). In a case where the transmission data is image data, the data format determination portion 258 determines, based on the hardware type and specification of the communication partner device, that the post-conversion data format will be Video Graphics Array (VGA), Quarter VGA (QVGA), Camera Image File Format (CIFF), or the like, for example (step S456). Then the format conversion portion 260 performs image compression processing such that the transmission data is converted into the data format that was determined by the data format determination portion 258 (step S458).

In a case where the transmission data is text data, the format conversion portion 260 performs text compression processing such that the data format of the transmission data is converted (step S460). In a case where the transmission data is audio data, the data format determination portion 258 determines, based on the hardware type and specification of the communication partner device, that the post-conversion data format will be AAC, WMA, MP3, or the like, for example (step S472). Then the format conversion portion 260 performs audio compression processing such that the transmission data is converted into the data format that was determined by the data format determination portion 258 (step S476).

After the processing at one of step S458, step S460, and step S476 is completed, the non-contact communication portion 216 transmits the transmission data, the data format of which has been converted, to the communication partner device (step S480). Note that the communication partner device that receives the transmission data whose data format has been converted can decode (perform decompression processing on the transmission data and use it.

3. CONCLUSION

As described above, in the mobile device 20 according to the present embodiment, the non-contact communication portion 216 receives from the other wireless communication device the unit specific data that indicates the communication function of the other wireless communication device. If the partner device determination portion 254 determines that the other wireless communication device is not compatible with the wireless communication whose communication speed is faster than that of the non-contact communication portion 216, the format conversion portion 260, by converting the data format of the transmission data that will be transmitted to the other wireless communication device, reduces the data volume of the transmission data. The non-contact communication portion 216 transmits to the other wireless communication device the transmission data whose data format has been converted. That is, in a case where the other wireless communication device is not compatible with the wireless communication whose communication speed is faster than that of the non-contact communication, the mobile device 20 reduces the data volume of the transmission data and transmits the transmission data. Therefore, the mobile device 20 according to the present embodiment can reduce the communication time that is required to transmit the transmission data to the other wireless communication device.

It should be understood by those skilled in the art that various modifications, combinations, sub-combinations and alterations may occur depending on design requirements and other factors insofar as they are within the scope of the appended claims or the equivalents thereof.

For example, the individual steps of the processing in the mobile device 20 according to the present invention do not necessarily have to be performed in a temporal sequence in the order shown in the flowcharts and the sequence chart. The individual steps of the processing may also be performed in parallel and individually (for example, in the form of parallel processing and object-oriented processing).

Furthermore, the hardware such as the personal computer 10, and the CPU 201, the ROM 202, the RAM 203, and the like that are built into the mobile device 20, can also be created in the form of a computer program that implements the same sorts of functions as those of the personal computer 10 and the configuring elements of the mobile device 20. A storage medium can also be provided to store the computer program.

What is claimed is:
1. A wireless communication system, comprising:
a first wireless communication device; and
a second wireless communication device, wherein
the first wireless communication device includes a non-contact communication portion that transmits by a non- contact communication method unit specific data that indicate a communication function of the first wireless communication device, the second wireless communication device includes a first communication portion that receives the unit specific data that are transmitted from the first wireless communication device by the non-contact communication method, a second communication portion that is capable of a wireless communication at a faster communication speed than that of the non-contact communication method, a determination portion that determines, based on the unit specific data, whether the first wireless communication device is equipped with a communication function that is compatible with the wireless communication, and a format conversion portion that converts a data format of transmission data that is transmitted to the first wireless communication device to a data format that reduces a data volume of the transmission data, and, if the determination portion determines that the first wireless communication device is not equipped with the communication function that is compatible with the wireless communication, the first communication portion transmits, by the non-contact communication method, to the first wireless communication device the transmission data whose data format was converted by the format conversion portion to reduce the data volume of the transmission data.

2. A wireless communication device, comprising:

a first communication portion that performs a non-contact communication with an other wireless communication device and receives unit specific data that indicate a communication function of the other wireless communication device;

a second communication portion that is capable of a wireless communication at a faster communication speed than that of the non-contact communication;

a determination portion that determines, based on the unit specific data, whether the other wireless communication device is equipped with a communication function that is compatible with the wireless communication; and a format conversion portion that converts a data format of transmission data that is transmitted to the other wireless communication device to a data format that reduces a data volume of the transmission data, wherein, if the determination portion determines that the other wireless communication device is not equipped with the communication function that is compatible with the wireless communication, the first communication portion transmits, by the non-contact communication, to the other wireless communication device the transmission data whose data format was converted by the format conversion portion to reduce the data volume of the transmission data.

3. The wireless communication device according to claim 2, further comprising:

a data format determination portion that determines, based on the unit specific data, what the data format of the transmission data will be after the transmission data is converted, wherein the format conversion portion converts the transmission data to the data format that was determined by the data format determination portion.

4. The wireless communication device according to claim 3, wherein the unit specific data include information that indicates a hardware type of the other wireless communication device, and the data format determination portion determines what the data format of the transmission data will be after the transmission data is converted, based on the hardware type of the other wireless communication device that is included in the unit specific data.

5. The wireless communication device according to claim 3, wherein the unit specific data include information that indicates a compatible data format for the other wireless communication device, and the data format determination portion determines, based on the unit specific data, that the data format of the transmission data after the transmission data is converted will be the compatible data format for the other wireless communication device.

6. The wireless communication device according to claim 3, wherein the data format determination portion determines that the data format of the transmission data after the transmission data is converted will be a data format that makes the data volume of the transmission data no greater than a specified volume.

7. The wireless communication device according to claim 3, wherein, if the determination portion determines that the other wireless communication device is not equipped with the communication function, the data format determination portion determines whether the transmission data includes at least one of image data, text data, and audio data.

8. The wireless communication device according to claim 2, wherein, if the determination portion determines that the other wireless communication device is equipped with the communication function that is compatible with the wireless communication, the second communication portion transmits to the other wireless communication device the transmission data whose data format has not been converted by the format conversion portion.

9. The wireless communication device according to claim 2, wherein, if the determination portion determines that the other wireless communication device is not equipped with the communication function, the format conversion portion compresses the transmission data.

10. The wireless communication device according to claim 2, wherein the first communication portion receives, by using the non-contact communication, setting data of the other wireless communication device, and the second communication portion transmits, using the wireless communication, based on the setting data, the transmission data whose data format has not been converted.

11. A non-transitory computer-readable storage medium encoded with a program comprising instructions that command a computer to function as a wireless communication device that performs a method comprising:

performing a non-contact communication with an other wireless communication device and receiving unit specific data that indicate a communication function of the other wireless communication device;

performing a wireless communication at a faster communication speed than that of the non-contact communication, if the other wireless communication device is equipped with a communication function that is compatible with the wireless communication;

determining, based on the unit specific data, whether the other wireless communication device is equipped with the communication function that is compatible with the wireless communication; and converting a data format of transmission data that is transmitted to the other wireless communication device to a data format that reduces a data volume of the transmission data, if the other wireless communication device is equipped with the communication function, wherein, if the determining determines that the other wireless communication device is not equipped with the communication function that is compatible with the wireless communication, the wireless communication device transmits, by the non-contact communication, to the other wireless communication device the transmission data whose data format was converted by the converting to reduce the data volume of the transmission data.

12. A wireless communication method comprising:

receiving from an other wireless communication device, by using a non-contact communication method, unit specific data that indicate a communication function of the other wireless communication device;

determining, based on the unit specific data, whether the other wireless communication device is compatible with a wireless communication method whose communication speed is faster than that of the non-contact communication method;

converting, if it is determined that the other wireless communication device is not compatible with the wireless communication method, a data format of transmission data that is transmitted to the other wireless communication device to a data format that reduces a data volume of the transmission data; and transmitting to the other wireless communication device, using the non-contact communication method, the transmission data whose data format was converted to reduce the data volume of the transmission data.

* * * * *